United States Patent [19]
Beck et al.

[11] Patent Number: 5,577,422
[45] Date of Patent: Nov. 26, 1996

[54] CONTROL PANEL ASSEMBLY FOR A MOTOR VEHICLE

[75] Inventors: Oliver Beck, Filderstadt; Martin Spengler; Manfred Ohlhausen, both of Boeblingen; Dieter Heinle, Pluederhausen, all of Germany

[73] Assignee: Mercedes-Benz AG, Stuttgart, Germany

[21] Appl. No.: 318,334

[22] Filed: Oct. 5, 1994

Related U.S. Application Data

[63] Continuation-in-part of Ser. No. 53,704, Apr. 29, 1993, abandoned.

[30]   Foreign Application Priority Data

Apr. 30, 1992 [DE] Germany .......................... 42 14 178.8

[51] Int. Cl.⁶ ................................................... F16P 1/00
[52] U.S. Cl. .................................. 74/612; 16/328; 16/330; 220/338
[58] Field of Search ...................... 74/612, 555; 200/333, 200/332.1, 332.2, 338; 220/338; 16/328, 330, 353

[56]   References Cited

FOREIGN PATENT DOCUMENTS

| 3246814 | 6/1984 | Germany . |
|---|---|---|
| 3409321 | 9/1985 | Germany . |

*Primary Examiner*—Vinh T. Luong

[57]   ABSTRACT

A control panel assembly for an air conditioning system in a motor vehicle with continuously freely accessible primary actuation elements is provided with selectively accessible secondary actuation elements arranged in an installation shaft recess in the front panel section of the control panel. The recess is covered with a cover element which can be moved about a horizontal axis of rotation. In order to provide access to the secondary actuation elements, an opening movement of the cover element uncovers the installation shaft recess with the control panel of the secondary actuation elements being simultaneously moved into a position which is accessible to the vehicle. The secondary actuation elements form a control module with a circuit board which bears them and is permanently connected to the cover element, which control module is mounted so as to be rotatable about the horizontal axis of rotation so that when the cover element is folded downwards the secondary actuation elements are swivelled into the recess in the front panel section of the control panel.

8 Claims, 2 Drawing Sheets

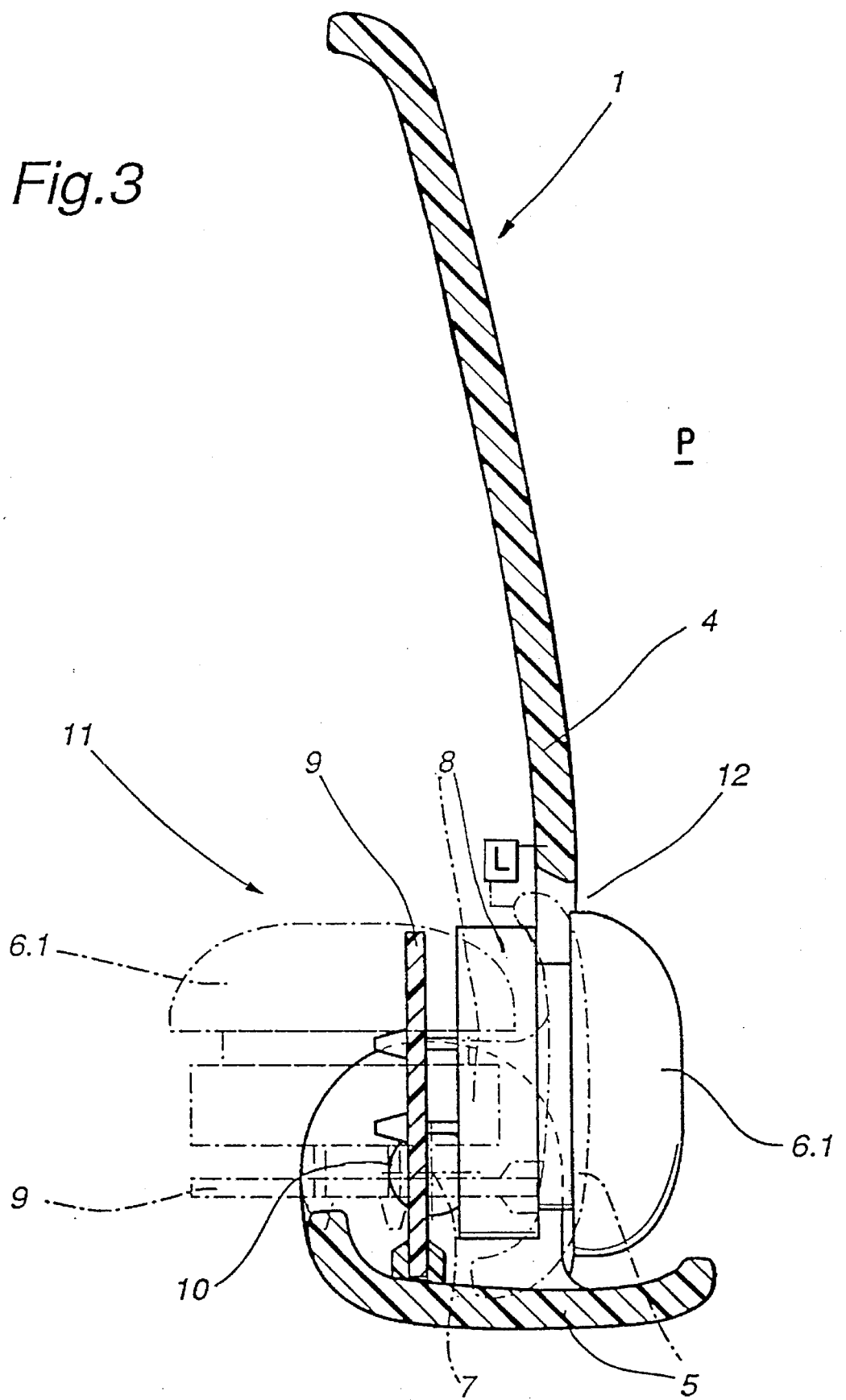

CONTROL PANEL ASSEMBLY FOR A MOTOR VEHICLE

BACKGROUND AND SUMMARY OF THE INVENTION

This is a Continuation-in-Part Application of application Ser. No. 08/053,704, filed on Apr. 29, 1993, now abandoned.

The invention relates to a control panel assembly for a motor vehicle of the type having manually engageable actuation elements to facilitate passenger selection of vehicle system operating conditions. The actuation elements include a first set of continuously accessible actuation elements and a second set of actuation elements which are selectively accessible to a vehicle operator passenger.

Control panels of the generic type are known, for example in television and hi-fi equipment such as disclosed in German Patent Document DE 34 09 321 C2, in which, for reasons of well organized design, secondary actuation elements which are rarely required are covered by a cover element which can be moved about an axis of rotation and which terminates flush with the front panel of the control panel. The secondary actuation elements here are arranged in an installation shaft, countersunk with respect to the front panel of the control panel. It is considered disadvantageous that the secondary actuation elements are, as a result, difficult to identify and control, which may distract the driver of a motor vehicle and can adversely affect driving safety. Furthermore, German Patent Document DE 32 46 814 A1 discloses an arrangement wherein secondary actuation elements are accommodated in an extractable push-in module so that, when required, the secondary actuation elements are not only accessible but are also moved into an ergonomically favorable position. The disadvantage with this solution is that, a large installation depth is required constructionally and that, in the event of a vehicle accident, a protruding push-in module increases the risk of injury in the head area.

An object of the invention is to avoid the disadvantages of the known control panels and to propose a control panel of the generic type, in which there is also good access to the secondary actuation elements.

This object is achieved according to preferred embodiments of the invention by providing for arrangements wherein the control panel of the secondary actuation elements is moved into a position which is user-friendly for the operator with an opening movement of the cover element which uncovers the installation shaft. Other objects, advantages and novel features of the present invention will become apparent from the following detailed description of the invention when considered in conjunction with the accompanying drawings.

BRIEF DESCRIPTION OF THE DRAWINGS

FIG. 3 is a schematic sectional side view of the movable control module of the control panel of FIGS. 1 and 2, taken along section III—III of FIG. 2.

DETAILED DESCRIPTION OF THE DRAWINGS

Figure 1:
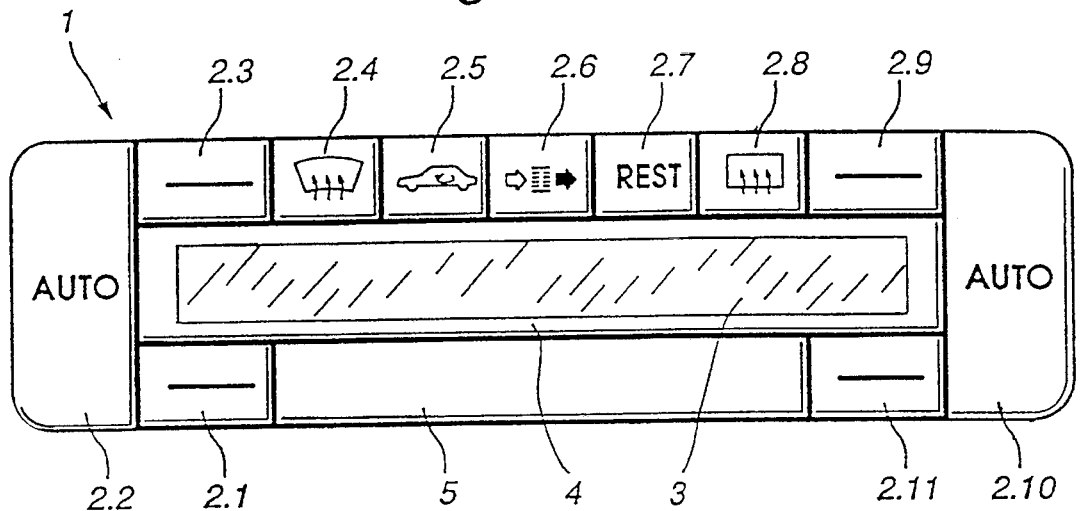
FIG. 1 is a schematic frontal view of a control panel for an air conditioning system of a motor vehicle shown in closed position, and constructed according to a preferred embodiment of the invention.

The exemplary embodiment illustrated in the drawings shows a control panel 1 for an air conditioning system which faces a vehicle passenger space P (FIG. 3). The control panel 1 is filled with keys of the actuation elements 2.1–2.11 which adjoin in a flush manner, a display device 3 (for example liquid crystal display), set into the front panel 4, and the cover element 5 (shown in closed position in FIG. 1). The most important functions of the air conditioning system can be switched on manually by the driver using the primary actuation elements. These primary actuation elements are: automatic keys 2.2, 2.10 which are separate for the left-hand and right-hand side of the vehicle, four set value adjustment keys 2.1, 2.3, 2.9, 2.11 for raising or lowering the temperature separately for the left-hand and right-hand side of the vehicle and five program keys 2.3–2.8 (Defrost program 2.4, air recirculation mode 2.5, activated carbon filter mode 2.6, utilization of the residual heat of the engine 2.7 and rear-window heater 2.9). These, in total, 11 primary actuation elements 2.1–2.11 are constantly visible and accessible.

Figure 2:
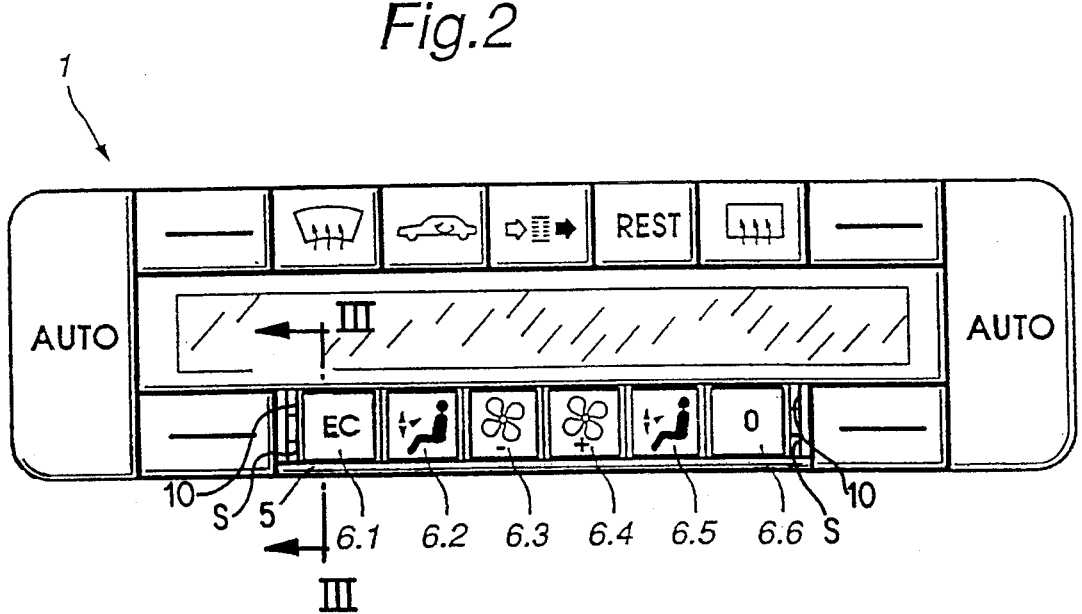
FIG. 2 a frontal schematic view which shows the control panel FIG. 1 in an open position.

By slightly pressing in the upper region of the cover element 5, the cover element 5 is unlocked and swivels out downwards automatically, after which the control panel of the secondary actuation elements 6.1–6.6 comes into view, as illustrated in FIG. 2. The secondary actuation elements 6.1–6.6 provide the user with the possibility of over-riding manually functions which can be controlled automatically by the air conditioning system. These are: an EC-key 6.1 (economy, i.e., no compressor operation), air distribution keys 6.2, 6.5 which are separate for the left-hand and right-hand side of the vehicle, two keys for selecting blower power 6.3, 6.4 and a O-key 6.6 for switching off the air conditioning. As illustrated in FIG. 3, the secondary actuation elements 6.1–6.6, constructed as key elements 8, are soldered onto a common circuit board 9 which is in turn rigidly mechanically connected to the cover element 5 in such a way that the surface of the cover element 5 which is visible in the closed position and the control panel of the secondary actuation elements 6.1–6.6 form a right angle. This inherently rigid arrangement forms a control module 11 which is movably connected at its two ends to in each case one lateral holder 10 via an axis of rotation 7 to the chassis of the control panel 1. The electrical contact is made to the circuit board 9 via a flexible cable (not illustrated in the drawing). Starting from a closed position (shown by broken lines), a quarter rotation of the control module 11 about the axis of rotation 7 results in the secondary actuation elements 6.1–6.6, which are constructed as key elements, swiveling into the installation opening or shaft recess 12 in the front panel 4 and thereby taking the place of the cover element 5 (shown by unbroken lines). In the open position, the upper edge of the cover element 5 terminates on the underside of the secondary actuation elements 6.1–6.6 and serves at the same time as a lever in order to move the control module 11 manually into the closed position.

In a simple, robust and inexpensive embodiment, the drive energy for the movement of the control module 11 is provided by the operator in a manual and mechanical fashion for example by tensioning a spring s (FIG. 2), it being possible for the movement to be damped by dry friction or hydraulically. The spring s coiled springs fixed respectively to the respective holders 10 and the chassis of the control panel so as to continuously push the control module 11 with the cover element 5 and circuit board 9 with secondary actuation elements 6.1–6.6 toward the open position of the cover element 5 shown in FIG. 2. However, a pneumatic or an electromotive drive is also contemplated according to certain preferred embodiments. In addition to indicate the concealed functions to the operator embodiments are contemplated with provisions when the cover element 5 is in the closed position for symbols which are illuminated and can be dimmed in night mode. When the cover element 5 is in the open position, provisions are provided for the secondary actuation elements 6.16.6 to be directly illuminated in a dimmable fashion for example by incident light, or indirectly illuminated for example by rear illumination.

A latch mechanism L, schematically depicted in FIG. 3, is provided with respective latching parts on the chassis of the control panel assembly and on the cover 5 for holding the cover 5 in the closed position shown in FIG. 1. The latching mechanism L is configured in a manner known per se by those skilled in the art of cover latches, so that the closed cover element 5 can be unlocked by manually tapping on an upper are of the cover element at which time the springs 5 will automatically bias the cover element to its open position shown in FIG. 2.

In a further preferred embodiment, it may be appropriate, in addition to the illustrated initial closed position and limit open position of the movable control module 11, to provide one or more catch points for intermediate positions so that these can also be set by the operator. A signal-generating unit (for example magnet/Hall sensor, photoelectric barrier, electric switches, potentiometers, incremental signal generators) can also be provided on the control module 11 in order to report its position to an electronic system.

Embodiments are also contemplated wherein the circuit board 9 and/or secondary actuation elements 6.1–6.6 are connected via a coupler mechanism to the movement of the cover element 5, so that with an open cover element, the secondary actuation elements carry out a translatory movement component in addition to the rotary movement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Control panel assembly for a motor vehicle comprising:
    a primary control panel containing a plurality of primary actuation elements which are facing in use in a first direction toward a vehicle passenger space,
    an installation opening in the primary control panel which faces in said first direction,
    a cover element supported at the primary control panel for pivotal movement about a pivot axis between a closed position with a cover surface of the cover element covering said installation opening, and an open position exposing said installation opening and with at least portions of said cover surface moved inwardly of said installation opening,
    and a secondary control panel containing a plurality of secondary actuation elements, said secondary actuation elements being mounted on a circuit board which is attached to the cover element with the second actuation elements disposed substantially in a plane extending at a right angle with respect to the cover element cover surface,
    whereby movement of said cover element from the closed position to the open position simultaneously places the secondary actuation elements in the installation opening and facing in the same first direction as the primary actuation elements,
    wherein said cover surface and said secondary control panel are similar in size and fill said installation opening in each of said respective closed and open positions of the cover element.

2. Control panel assembly according to claim 1, wherein the secondary actuation elements are constructed as key elements and form a control panel which fills the installation opening recess in a virtually flush manner.

3. Control panel assembly according to claim 2, wherein the closed cover element is configured to be unlocked by tapping on an upper area of the cover element, after which the cover element swivels automatically to the open position.

4. Control panel assembly according to claim 1, wherein the secondary actuation elements are constructed as key elements and form a control panel which fills the installation opening recess in a virtually flush manner.

5. Control panel assembly according to claim 1, comprising drive energy means for assisting manual movement of the cover element between its closed and open positions.

6. Control panel assembly according to claim 5, wherein said drive energy means includes a spring.

7. Control panel assembly according to claim 1, comprising a spring for assisting manual movement of the cover element between the closed and the open positions.

8. Control panel assembly according to claim 1, wherein said pivot axis is a permanent fixed pivot axis.

* * * * *